May 16, 1961
R. W. BORN
2,984,072
HYDRAULIC JACK ASSEMBLY WITH SYNCHRONIZING AND
FLOW EQUALIZING VALVE MECHANISM
Filed Jan. 12, 1959
3 Sheets-Sheet 3

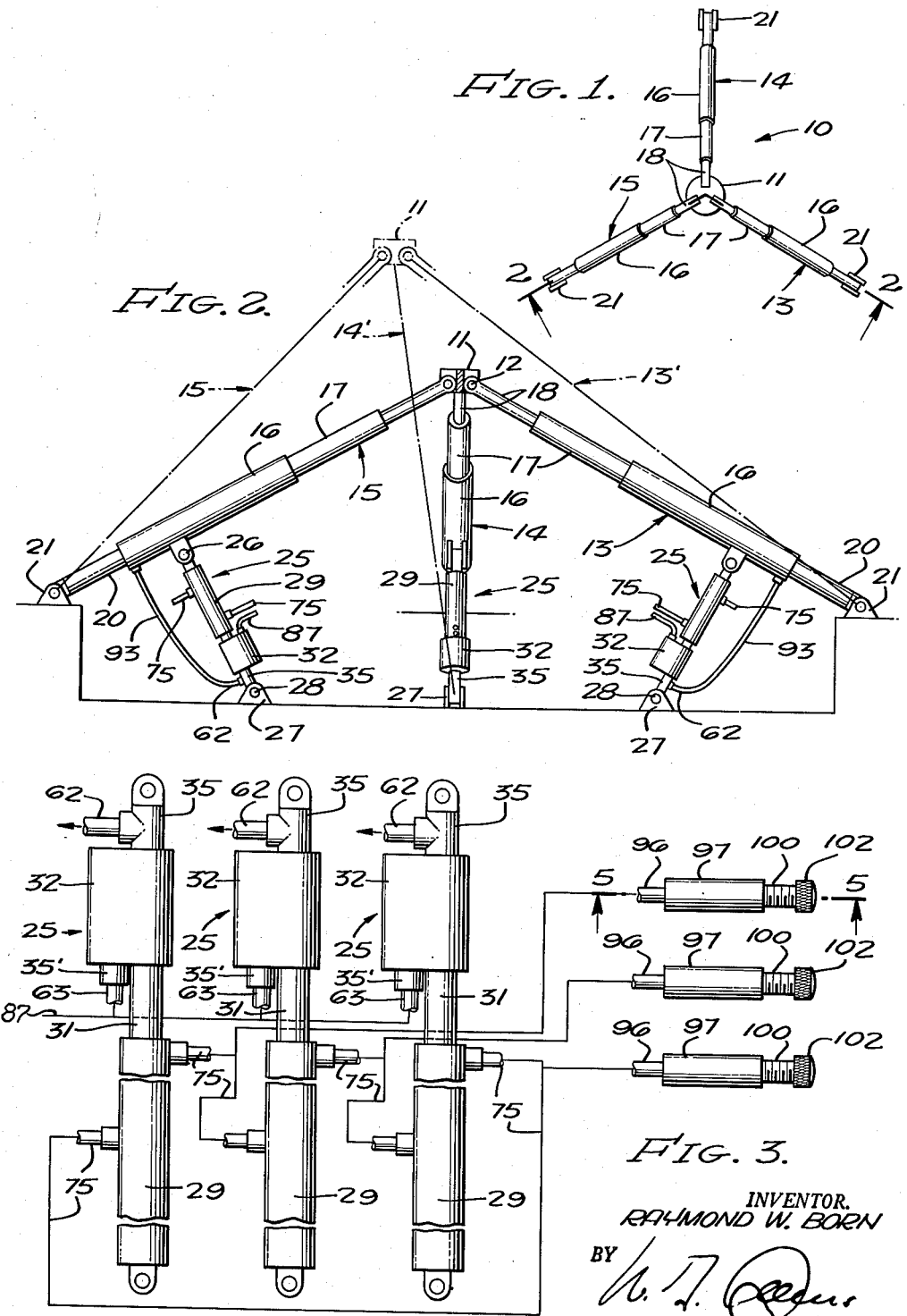

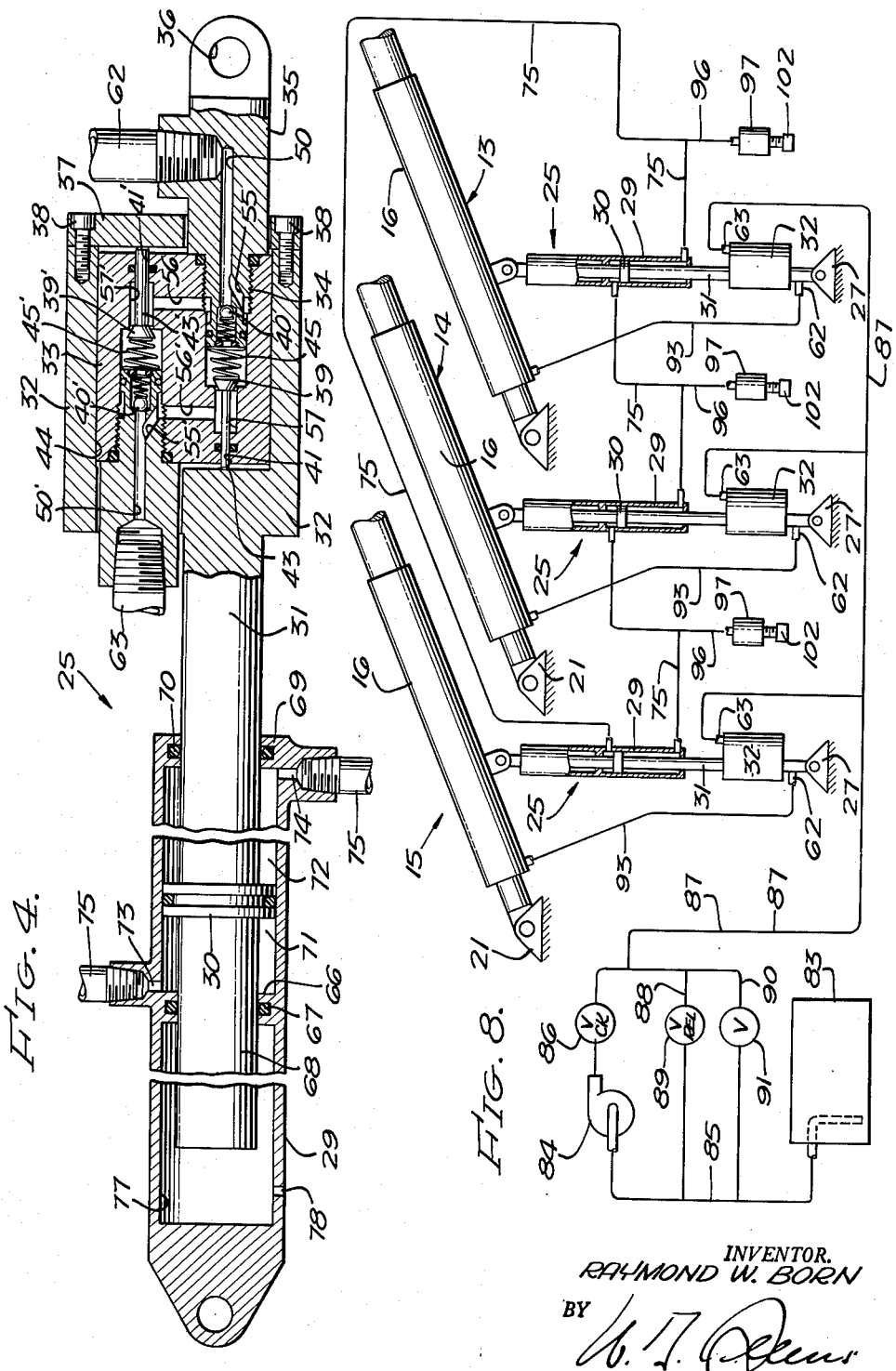

INVENTOR.
RAYMOND W. BORN
BY
ATTORNEY

United States Patent Office 2,984,072
Patented May 16, 1961

2,984,072
HYDRAULIC JACK ASSEMBLY WITH SYNCHRONIZING AND FLOW EQUALIZING VALVE MECHANISM

Raymond W. Born, West Covina, Calif., assignor to Hydraulic Engineering, Inc., West Covina, Calif., a corporation of California Filed Jan. 12, 1959, Ser. No. 786,367
23 Claims. (Cl. 60—97)

This invention relates to hydraulic cylinders and more particularly to an improved load-supporting jack assembly having operatively associated therewith automatic synchronizing and hydraulic fluid flow regulating mechanism operable to synchronize the movements of two or more cylinders acting in parallel to advance the load along a predetermined path unerringly and despite unbalanced loading of the jack or shifts of the load on the jack.

There are many applications for hydraulic jacks and other load moving assemblies requiring the use of two or more hydraulic cylinders acting in concert to support a load and wherein it is mandatory that the movement of all cylinders be positively and precisely synchronized both during extension and retraction of the cylinders. By way of illustration of such needs, there is mentioned the elevation of pre-cast concrete floors from their casting position at ground level to the assembled position thereof spaced vertically along supporting columns. Another typical application deals with the loading and testing of portions of aircraft frames to determine the load carrying abilities of different parts of the frame under different loading conditions such as those likely to be encountered in flight. The latter use of hydraulic jacks presents particularly serious problems. For example, in the testing of a wing section, if the root end of the wing is rigidly anchored and the load is applied between the root and the tip of the wing, it is desirable that the load continue to be applied substantially normal to the wing surface as the wing flexes about the rigidly anchored root end. For these purposes it is usually desirable to use either a bipod or a tripod type jack arranged to apply the load to the wing at a selected point with the path of advance being inclined to the vertical as well as to the stationary support for the jack. This end objective requires that the legs of the jack extend non-uniformly and in accordance with a predetermined pattern which may or may not be uniform depending upon the nature of the lifting problem and the objectives of the test.

Various attempts have been made heretofore to provide a hydraulic jack utilizing a plurality of hydraulic cylinders arranged in parallel and capable of extension of retraction under precisely controlled conditions. However, there has not been provided heretofore a jack mechanism satisfactorily meeting the above mentioned and similar exacting requirements frequently encountered both in the laboratory and in the field.

By the present invention there is provided an extensible load-supporting jack assembly incorporating in te fluid supply line thereof sensing mechanism capable of making high precise comparisons between the rates of advance of two or more hydraulic cylinders of a jack or the like assembly and automatically varying the fluid flow for said cylinders in a manner to maintain the movements of each cylinder precisely coordinated. According to one preferred arrangement this sensing mechanism includes a slave cylinder having one end connected to the movable jack cylinder and another end connected either to a stationary part of the jack or to some other nearby stationary object. Movably carried on the piston rod of the slave cylinder is an automatic valve mechanism connected in the fluid supply line for the main hydraulic cylinder of the associated jack leg. The interconnected opposite ends of the slave cylinder are completely filled with fluid with the result that any movement of the main cylinder tends to extend or retract the piston of the slave cylinder causing fluid to be shifted from one end of the slave cylinder to the other.

Operatively connected with the movable component of the slave cylinder is a servo type sensor valve assembly for controlling the flow of hydraulic fluid to the main jack cylinder. This valve assembly is responsive to the slightest variation from a predetermined pattern of movement of two or more jack cylinders acting in concert to support a load to maintain this predetermined movement pattern. This type of sensing mechanism has particular application in situations where the load cylinders are inclined to one another as they are when forming the extensible legs of bipod or tripod jack type assemblies, the slave cylinder then functioning to maintain the servo valves properly synchronized despite the constantly changing angular position to the sensing mechanism with respect to jack legs as they are extended or retracted.

In another preferred embodiment of the sensing mechanism, the slave cylinder component may be omitted together with its function. For example, if the axes of the multiple jack legs remain substantially parallel to one another as they do when elevating precast slab floors into position along supporting columns, any variation in the angular relationship of the plane of the slab to the jack axes can be utilized to control the flow controlling servo valves associated with each jack leg to maintain movement of all jack legs precisely synchronized. In this arrangement the opposite ends of the two relatively movable portions of the servo valves are connected diagonally between one end of the jack legs and a rigid member common to the adjacent ends of the jack legs. Thus, the valves can be connected diagonally between the lower ends of the legs and the support for the legs. Or, alternatively, the valves can be connected diagonally between the upper ends of the jack legs and adjacent portions of the floor slab being handled.

For certain operations it is important that the load be moved along a predetermined path with one leg of the jack moving at a different rate than one or more of the other legs. In others it may be necessary or desirable that the rate of extension of one or more legs be varied relative to others during the movement of the jack as a whole. Either of these modes of operation is easily and readily available in the jack of the present invention merely by the appropriate adjustment of the separate variable capacity reservoirs located in the closed loop circuit interconnecting the opposite ends of the slave cylinders.

Accordingly, it is a primary object of the present invention to provide a hydraulic jack having automatic means associated therewith for regulating and controlling the rate of extension or retraction of the jack.

Another object of the invention is the provision of a hydraulic jack assembly provided with a main hydraulic cylinder and an associated motion-sensing and fluid-flow regulating mechanism for sensing the rate and direction of movement of the jack and responsive to such determinations to maintain a desired rate and direction of jack movement despite non-uniform loading or variations in the distribution of the load on the jack.

Another object of the invention is the provision of hydraulic jack synchronizing mechanism connected in circuit with the pressurized fluid supply line for each cylinder of the jack and including means for sensing the slightest departure of the jack from a desired mode of operation and utilizing the sensed variations to operate corrective flow regulating mechanism.

Another object of the invention is the provision of separate servo valve mechanisms operatively connected between movable and non-movable portions of the associated legs of a hydraulic jack assembly which valve mechanisms cooperate in comparing the rates of movement of the several jack legs and in maintaining the leg movements precisely related to one another in a predetermined manner.

Another object of the invention is the provision of a multiple leg hydraulic jack assembly each leg of which is provided with servo valve means for regulating the flow of fluid to and from the associated jack leg cylinder at a rate precisely synchronized with the fluid flow rates for the other leg cylinders.

Another object of the invention is the provision of simple, easily-adjusted means for varying the automatically synchronized rates of movement of any one leg relative to the remaining legs of a multiple legged jack assembly.

Another object of the invention is the provision of a hydraulic jack having connected in the fluid supply line therefor servo valve mechanism operable in response to axial movement of the jack leg to regulate the flow of fluid automatically and independently of variation in the load imposed on the jack.

Another object of the invention is the provision of a tripod hydraulic jack assembly featuring high sensitivity angle measuring means associated with each leg thereof and operable to maintain a predetermined pattern of angular changes between said legs and the axis of jack movement as the jack is extended or retracted.

Another object of the invention is the provision of an improved, automatically-operable servo valve mechanism for use with hydraulic cylinders.

Another object of the invention is the provision of a slave cylinder sensing mechanism for controlling the flow of fluid to and from hydraulic cylinders.

Another object of the invention is the provision of servo valve and movement sensing assembly for use in controlling the extension and retraction of a jack cylinder and incorporating means therein for maintaining the sensing assembly continuously preloaded so long as pressurized fluid is present within said sensing assembly.

These and other more specific objects will appear upon reading the following specification and claims and upon considering in connection therewith the attached drawings to which they relate.

Referring now to the drawings in which a preferred embodiment of the invention is illustrated:

Figure 1 is a top plan view of a three-legged jack assembly incorporating the present invention;

Figure 2 is an enlarged side elevational view of the jack shown in Figure 1, parts being broken away to show construction details and one of the many extended positions thereof being indicated by a dot and dash line phantom showing;

Figure 3 is a schematic view of a portion of the hydraulic connections between the automatic synchronizing and regulating devices forming an important feature of the invention;

Figure 4 is a longitudinal sectional view on an enlarged scale through one of the sensing and servo valve synchronizing assemblies, the parts being shown in their normal operating position for the uniform flow of pressurized fluid to the associated main hydraulic cylinder;

Figure 8 is a schematic diagram of the fluid flow connections for a three-legged hydraulic jack of the type depicted in Figure 1.

Figure 5:
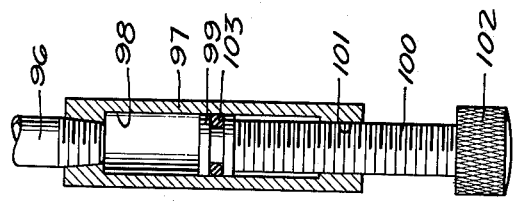
Figure 5 is a cross-sectional view on an enlarged scale of one of the remote control devices taken along line 5—5 on Figure 3.

Referring more particularly to Figures 1 and 2, there is shown one preferred embodiment of the invention in the form of a three-legged hydraulic jack assembly designated generally 10. This jack assembly includes a load supporting head 11 having pivotally connected thereto as by pivot pins 12 three identical legs 13, 14 and 15, each formed by multiple stage hydraulic cylinders 16, 17 and 18. These cylinders will be understood as having a piston head of suitable character fixed to their inner ends and operable to extend axially of the tubes when pressurized fluid is supplied to the inner end of lower cylinder 16 in a manner which will be described presently. Rigidly secured to the lower end of each of the legs is a strut 20 having a pivotal connection with a wide area base plate 21.

Operatively associated with each of the legs of the jack assembly are identical sensing and flow control mechanisms designated generally 25, the internal constructional details of each being shown in Figure 4. The upper ends of assemblies 25 are pivotally connected by a pin 26 to the lower end of jack cylinders 16 and their lower ends are pivotally connected to a base plate 27 by a pin 28. The upper section of the sensing mechanisms comprises a slave cylinder 29 slidably supporting a piston 30 (Figure 4) positioned intermediate the ends of a piston rod 31. Fixed to the exterior end of rod 31 is an outer housing 32 provided with a bore 44 slidably seating an internal cylindrical valve housing 33. The latter housing has limited sliding movement axially of piston rod 31 and of outer housing 32. The threaded shank end 34 of a bushing 35 is snugly seated in a threaded bore opening through the lower end of valve housing 33 and its outer end has a transverse bore 36 for the pivot pin 28 connecting the lower end of sensing mechanism 25 to base plate 27. Valve housing 33 is held assembled within outer housing 32 by a cap plate 37 held in place by cap screws 38.

The servo valve mechanism housed within inner housing 33 comprises a pair of substantially duplicate valve assemblies each here shown as including a poppet valve 39 and a check valve 40, it being pointed out that the particular design of the valve members may vary widely within the scope of the present invention. The corresponding components of the second valve assembly as well as of the other cooperating features of the servo valve are identified by the same reference numerals distinguished by the addition of a prime. It will be understood that the components of two valve assemblies are in alignment with one another and parallel to the axis of piston rod 31. The stem 43, 43' of each poppet valve has a loose sliding fit in a bore 41, 41' at the opposite ends of housing 33 and is sealed with respect thereto as by an O-ring 42. The poppet valve stems are held lightly biased in opposite directions and against the adjacent end walls of bore 44 of outer housing 32 by helicall springs 45, 45'. Thus, spring 45 is interposed between the inner end of poppet valve 39 and the inner end 46 of bushing 35 which end seats an O-ring 47 cooperating with the fluid passage 48 in forming a fluid-tight seal. Ball check valve 40 is urged toward seating engagement with the inner end of fluid passage 50 extending axially of bushing 35 by a light coil spring 51, the latter together with check valve 40 being held assembled within the enlarged inner end of passage 50 by an annular externally threaded ring 52.

The area between inner end 46 of bushing 35 and shank 34 of this bushing is provided with a wide annular groove 54 in communication with fluid passage 50 through an inclined radial port 55 in order that liquid may pass into annular groove 54 and thence transversely of valve housing 33 via a passage 56 opening into an annular chamber 57' surrounding stem 43' of poppet valve 39'.

The other duplicate valve assembly comprising check valve 40' and poppet valve 39' is held assembled within the stepped and threaded bore 48' by bushing 35' having a threaded shank 34' threaded into housing 33 on the opposite end thereof from the first described bushing 35. Bushings 35, 35' are provided with an O-ring gasket 59, 59', respectively, surrounding the base end of their threaded shanks 34, 34'. The enlarged outer end of each bushing 35, 35' passes freely through openings 60, 60' of outer housing 32, opening 60 at the right-hand end of the assembly being in end cap 37 and opening 60' being in the housing end wall closely adjacent piston rod 31. Pressurized hydraulic fluid enters and leaves passage 50 in bushing 35 laterally through a threaded opening seating a nipple 62. Likewise, bushing 35' is provided with a threaded opening in alignment with fluid passage 50' and seating therein a fluid-conveying nipple 63.

It remains to be pointed out that the two valve assemblies 39, 40 and 39', 40' are identical except in one respect, namely, the cross-sectional area of valve stems 43 and 43', the area of the latter being slightly greater than that of stem 43. The lengths of stems 43, 43' are so related to the seats for each of poppet valves 39, 39' as well as to the opposite ends of chamber 44 that both poppet valves 39, 39' are not only open when inner valve housing 33 is positioned midway between the opposite ends of cylindrical bore 44 (as it is in Figure 4), but properly positioned to control the flow of fluid to and from the jack leg cylinders. It will be further understood that when the left-hand end of inner housing 33 is positioned at the extreme left-hand end of bore 44, as it is in Figure 7, valve 39 is fully open and corresponding valve 39' is fully closed. When the inner valve housing 33 is positioned at the other extreme position against the inner surface of end cap 37, as it is in Figure 6, valve 39' is fully open and valve 39 is fully closed. When the control valves for slave cylinders 29 are properly adjusted in a manner to be described presently and under normal operating conditions, outer housing 32 moves only a few mils in either direction as necessary to vary the fluid flow to the slight extent necessary to maintain the desired predetermined movement of the jack leg cylinders.

Referring now more particularly to Figure 4, slave cylinder 29 will be understood as provided midway between its opposite ends with an inwardly projecting annular flange 66 seating an O-ring 67 having a fluid-tight seal with the inner end 68 of piston rod 31. The lower end of cylinder 29 is likewise provided with a similar inwardly projecting flange 69 seating an O-ring 70 forming a fluid-tight seal with the outer end of piston rod 31. Slave cylinder piston 30 is movable to and fro between flanges 66, 69, and cooperates therewith in forming a pair of fluid chambers 71, 72, it being understood that these are completely filled with a suitable fluid such as a hydraulic liquid or an oil. Such fluid enters and leaves the remotely situated ends of chambers 71, 72 through threaded ports 73, 74, respectively, and connected in a closed loop circuit with the slave cylinders for each jack leg by means of conduits 75 connected as is clearly shown in Figures 3 and 8. The inner end 68 of the slave cylinder piston rod reciprocates within a closed chamber 77 corresponding in length to the sum of the lengths of chambers 71 and 72 and vented to the atmosphere through a bleed port 78.

Referring now to Figure 8, there will be described the simple hydraulic fluid circuit interconnecting each of the extendable jack legs 13, 14 and 15 as well as sensing mechanisms 25 for each of these legs. Thus, this plumbing circuit includes a hydraulic fluid reservoir 83 in communication with the inlet of a suitable power driven high pressure pump 84 through an inlet conduit 85. The pressurized fluid discharging from pump 84 passes through a forwardly opening check valve 86 into a conduit or manifold 87 connected to each of servo valve nipples 63 opening into bushings 35'. A surplus fluid line 88 connected between conduits 87 and 85 includes a normally closed pressure relief valve 89 cooperable with pump 84 to maintain the pressure within supply line 87 substantially constant. A second conduit 90 connected between manifold 87 and conduit 85 is provided with a normally closed manually operated needle valve 91 operable to control the return flow of fluid to the reservoir during any retraction movement of jack assembly 10. During extension of the jack, needle valve 91 is closed and the fluid supplied from the pressurized supply manifold 87 passes through the servo valve assemblies of sensing mechanisms 25 and to the associated one of the jack cylinders 13, 14 and 15 by way of flexible hoses 93 interconnecting nipples 63 of the servo valves with the fluid inlet at the lower end of jack leg cylinders.

There remains to be described the simple means provided by this invention for initially adjusting each of the servo valves to its proper control position and for thereafter independently controlling the expansion and retraction rate of each jack leg. Manipulation of this control may be provided at the user's option either directly at the jack or at any selected remote point. To this end, each section of conduit 75 between an adjacent pair of slave cylinders has connected thereto a branch 96 which terminates in a tubular casing 97 (Figure 5), forming a fluid reservoir 98. A piston 99 mounted on the end of a threaded stem 100 mating with threads 101 in the outer end of tube 97 is adjustable along the interior of reservoir 98 by turning knob 102 at the outer end of stem 100. Piston 99 preferably includes a sealing ring 103 and its movement axially of casing 97 is effective to vary the storage capacity of reservoir 98. By the proper relative adjustments of the several control knobs 102 the closed fluid circuit formed by conduits 75 and chambers 71, 72 of the slave cylinders can be fully and completely charged with fluid and properly positioned to hold each of the servo valve assemblies centered in its optimum sensitivity position as is illustrated in Figure 4.

*Operation*

The operation of the jack assembly will now be described, it being assumed that the jack is adjusted as illustrated in Figures 1 and 2 and that the load to be elevated is positioned against load supporting head 11 interconnecting the upper ends of jack legs 13, 14 and 15. Initially control knobs 102 associated with each of the fluid control reservoirs 98 of the closed circuit of the slave cylinders are backed off or opened sufficiently for each of servo valve housings 33 to be in the extreme upper position of bore 44, or at the left-hand end of bore 44 as viewed in Figure 7. Hydraulic pump 84 is then placed in operation to fill hydraulic fluid line 87 with pressurized fluid under the control of the automatic pressure relief valve 89. The flow of fluid to each of the jack cylinders takes place by way of the servo valves in sensing mechanisms 25, but before these automatic servo valves can be effective to synchronize the fluid flow to each cylinder, it is necessary to bring each servo valve housing 33 into its proper operating position between the opposite ends of the bores 44 in outer housings 32.

Figure 6:
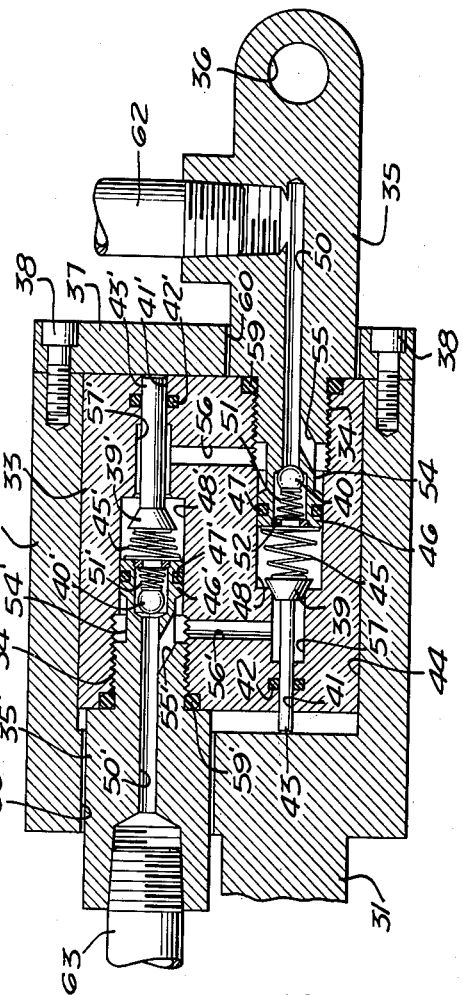
Figure 6 is an enlarged fragmentary view of the servo valve synchronizing assemblies shown in Figure 4 but with the parts in the position occupied during an initial phase of adjustment of the servo valves following erection of the jack.
Figure 7:
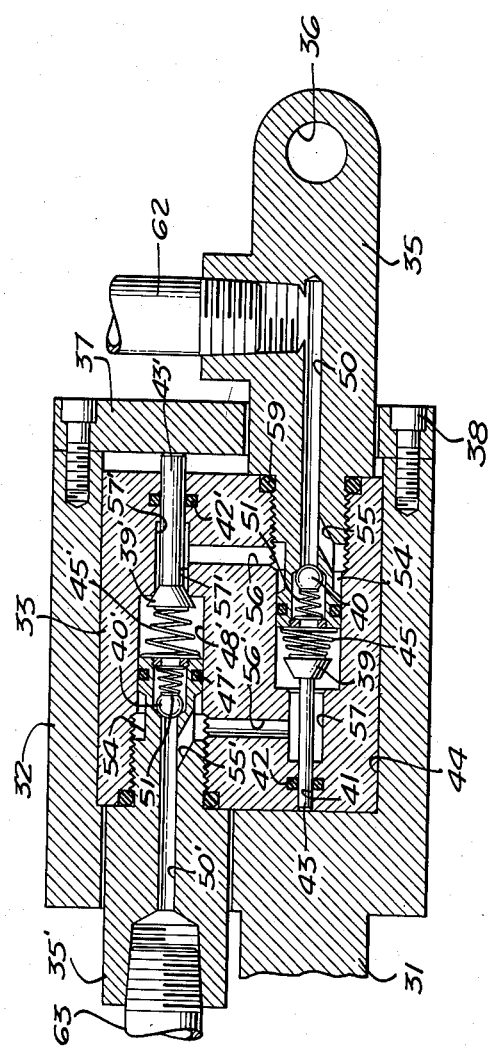
Figure 7 is a view similar to Figure 6 but showing the position of the parts during another phase of the servo valve adjustment.

To make this adjustment of the servo valves, the operator must make a series of trial and error adjustments of control knobs 102 of the slave cylinder circuit, the object being to so position each of the knobs 102 and each of the slave pistons 30 that the associated servo valve housing 33 is in its optimum position of sensitivity. When the adjustment is correctly made the entire slave cylinder circuit will be completely filled with liquid and each of the servo valves will be centrally located in bores 44 and in its optimum control position. When the control knobs 102 are approximately correctly positioned, any individual knob position can be checked by adjusting it outwardly until the associated servo valve housing comes to rest against the inner end of bore 44, as is illustrated in Figure 7. Thereafter, the knob is adjusted inwardly until the same valve housing 33 abuts the inner surface of cap 37, as is illustrated in Figure 6. It is then known that an adjustment of knob 102 substantially midway between the described two extreme positions is the desired correct operating position. The system is now in readiness for use to elevate a load with full assurance that each leg will extend in precise unison under the fully synchronized and automatic control of slave cylinders 29 working in harmony with the associated servo valves.

Before describing this operation in detail it should be recognized that the differential cross-sectional areas of valve stems 43, and 43' play an important role in that the larger area of stem 43' enables the pressurized fluid acting equally on the inner ends of these stems to exert a preponderant force on stem 43'. This force is impressed on end cap 37 of outer valve housing 32 thereby placing piston rod 31 of sensing mechanisms 25 under slight tension at all times and irrespective of varying load conditions, shifting loads or direction of jack movement. This constantly maintained tension condition avoids any possibility of lost motion and assures maximum response and sensitivity of the components at all times.

Continued operation of pump 84 causes pressurized fluid to flow through manifold 87 and through inlet nipples 63 of each servo valve and thence to the associated jack leg cylinder by way of nipples 62 and the flexible hoses 93 connecting these nipples to the lower jack cylinders 16. In passing through the servo valves the high pressure fluid opens check valve 40', flows past open poppet valve 39' into annular chamber 57' surrounding valve stem 43' and through transverse passage 56, through inclined bore 55 into passage 50 and thence through nipple 62 into hose 93. The high pressure fluid will also tend to flow through passage 56' and past open poppet valve 39. However, actual flow will not take place since the pressure buildup on the discharge side of valve 39 will act in cooperation with check valve spring 51 to seat valve 40 across the inner end of passage 50. Accordingly, fluid flow to the jack leg cylinders actually takes place along only the first-described path, namely, past open check valve 40', valve 39' and to outlet passage 50 by way of passages 56, 55.

Owing to the slight tension continuously maintained on sensing mechanisms 25 at all points between pivot pins 26, 28 by the described action of the pressurized fluid on the unequal cross-sectional areas of valve stems 43, 43', each of the sensing mechanisms is instantly and sensitively responsive to any tendency of jack legs 13, 14, or 15 to shift out of harmonious movement relative to one another. As each jack leg extends axially of itself, the angular position of the leg changes relative to any common datum plane such as either a horizontal or a vertical plane.

This continually changing angular position of the jack legs during either extension or retraction necessitates axial lengthening or shortening of the sensing mechanisms between the centers of pivot pins 26 and 28. This change of length is provided for by slave cylinders 29 and their associated pistons 30. The force required to shift pistons 30 relative to slave cylinders 29 without upsetting or affecting the very delicate and finely regulated position of servo valves 39, 39' controlling the rate of flow of pressurized fluid is assured by reason of the tension forces automatically maintained between the components of the sensing mechanisms, namely, by the action of the pressurized fluid within servo valve housing 33 acting on the differential cross-sectional areas of valve stems 43 and 43'. This differential area may be varied by the designer to assure that there are adequate tension forces acting in the sensing mechanisms to overcome frictional losses involved in the relative movement of cylinders 29 and pistons 30.

Should there be any tendency for one leg to attempt movement at a rate different than the others, it will be recognized that such tendency is accompanied by a related unequal change in the angle of the affected leg with respect to a datum plane and with respect to the angular changes of the other legs thereto. This tendency of an errant angular change in one jack leg will be instantly sensed by the associated sensing mechanism 25. The reason for this instant sensing is twofold: first, each leg is maintained under tension in the manner described above, and secondly, all slave cylinders and pistons are connected in a closed and completely filled fluid circuit provided by conduits 75. Accordingly, there can be no relative change between the piston and cylinder of one slave assembly which is not accompanied by a similar change in the remaining slave assemblies.

From the foregoing it will be appreciated that all slave pistons are free to move in absolute unison with one another so long as the jack legs are moving in unison. However, the instant there is any tendency for non-simultaneous relative movement of the slave pistons and cylinders, the affected slave cylinder is positively locked against non-uniform movement by the incompressible trapped liquid with the result that the erring jack leg is effective through sensing mechanism to shift valve 39' in the direction required to vary the fluid flow to the jack leg in the exact amount required to maintain the jack movement precisely in line.

Let it now be assumed that it is desired to have the jack extend along a line inclined to the vertical with each leg extending at a different rate. Under these conditions the jack head will advance along the inclined path suggested by the full and dot and dash line showings of the jack in Figure 2. This result is achieved by the proper relative adjustment of control knobs 102 controlling the storage capacity of reservoirs 98 in communication through conduits 96 with each of the conduits 75 (Figure 8). Since the closed loop circuit interconnecting the slave cylinders has a fixed liquid capacity, and since this circuit must be maintained full at all times if the system is to be instantly and accurately responsive, it follows that enlarging the storage capacity of one reservoir by turning knob 102 outwardly must be compensated for by transferring liquid from one or more of the remaining control reservoirs into other portions of the closed circuit by the proper inward adjustment of other of valves 102. The adjustment of the knobs allows one piston 30 to shift in one direction as at least one other piston shifts in the opposite direction in its slave cylinder. This relative shifting of pistons 30 effects a corresponding change in the opening of poppet valve 39' with the result that the jack cylinder fed thereby extends at a different rate than does the cylinder of another jack leg due to the different adjustment of its fluid supply poppet valve 39'. It will be recognized that once a proper adjustment of knobs 102 has been made, the servo valves, and the system as a whole, functions in substantially the same manner described above to maintain the non-uniform extension of the jack legs along a predetermined path, as for example along the axes suggested by the dot and dash lines 13', 14' and 15' in Figure 2.

In view of the foregoing, it will be appreciated that non-uniform loading of the jack or the application of a lateral force to the load supported, or to head 11 of the jack assembly, cannot possibly upset the accurately synchronized operation of the servo valves. The reason for this is that the slave cylinder loop circuit is instantly responsive to any unequal relative shifting of the jack legs with respect to a datum plane to provide a compensating flow of pressurized fluid in the amount and to particular jack legs as necessary exactly to counteract the disturbing force. Since the liquid used in the jack assembly is non-compressible, it follows that the system is capable of resisting unbalanced and transient forces to the limit of the strength of the components making up the assembly.

Once the load has been elevated to a desired position, it is locked there by the simple expedient of discontinuing the supply of pressurized fluid. Check valve 86 operates instantly and automatically to prevent backflow of the fluid through the pump to reservoir 83. Continued expansion of the jack is achieved simply by re-starting pump 84 to renew the supply of fluid to the jack legs.

When it is desired to lower the jack under load or otherwise, needle valve 91 in bypass conduit 90 is slowly opened to allow fluid from the jack leg cylinders to return to reservoir 83. This return flow takes place by way of flexible hoses 93 and the servo valves associated with each sensing device. Under normal operating conditions and with each leg of the jack retracting at the same rate, the positions of the servo valves are identical with those described for the extension of the jack with the exception of the positions of one-way check valves 40 and 40'. Thus, during lowering of the jack, check valve 40' is maintained firmly closed whereas check valve 40 is lifted from its seat by the reverse flow of fluid inwardly along passages 50 and past open valve 39. The liquid enters valve housing 33 through passage 50, passes the open check valve 40, flows past open poppet valve 39 and passes about valve stem 43 into passage 56' and into the outlet passage 50' by way of the inclined passage 55'. The returning fluid then exits through conduit 63 and along manifold 87, conduit 90 and into reservoir 83 by way of conduit 85, the lowering rate of the jack being controlled by the adjustment of needle valve 91. No liquid flow occurs through passage 55, 56 leading into the chamber housing poppet valve 39' for the reason that the high pressure maintained on the returning liquid maintains check valve 40' firmly seated.

Should one leg of the jack show any tendency to retract faster than another, such tendency is instantly sensed by sensing devices 25 with the result that the servo valves are individually and automatically adjusted in the manner made clear above to compensate for such tendency. If it is desired to increase the jack retraction rate, it is merely necessary to open valve 91 further to permit the returning fluid to return to reservoir 83 at a faster rate. Likewise, slowing down of the retraction of the jack is accomplished by partially closing valve 91 to achieve the rate of retraction desired. The jack may be locked in any desired position during retraction simply by fully closing valve 91. Re-extension of the jack from any intermediate lowered position is accomplished by maintaining valve 91 closed and restoring the hydraulic pump 84 to operation.

A particularly important function of the servo valve assemblies is to prevent any possibility of exchange of fluid between the jack leg cylinders as might be expected to occur under unequal loading conditions, by a sudden shift in loading conditions, or by the application of forces acting laterally of the path of jack movement. These and the like disturbing factors on the distribution of the fluid between the jack cylinders are positively safeguarded against by the highly sensitive check valves 40 and 40' of the servo valve assemblies. These check valves are normally maintained closed by springs 51, 51' except when these springs are overcome by a counteracting pressure applied by the hydraulic fluid. However, these springs and check valves are so positioned relative to the jack leg cylinders as to be locked closed under fluid pressure upon the slightest tendency of fluid to flow from one jack leg to another as will be readily apparent from the foregoing and a consideration of Figures 4 and 8.

While the particular hydraulic jack assembly with synchronizing and flow equalizing valve mechanism herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:
1. In combination, a plurality of hydraulic cylinders cooperable to support a load and to move the load along a predetermined path, hydraulic circuit means connected to supply pressurized fluid to each of said cylinders, motion sensing means operatively associated with each of said cylinders for sensing minute variations in the movement of the cylinder associated therewith away from said predetermined path, and pressurized fluid means responsive to variations sensed by said sensing means for positively increasing and decreasing the relative flows of pressurized fluid to said cylinders as necessary to prevent movement of the same away from said predetermined path.

2. A synchronized assembly of hydraulic cylinders cooperable to support a load and to move the same with precision along a predetermined path of movement, said assembly comprising a plurality of load supporting cylinders arranged in parallel and effective in response to the flow of pressurized hydraulic fluid to cooperate in moving a load supported jointly thereby, sensing means connected with each of said cylinders operable to keep movements of said cylinders synchronized with one another for conjoint movement along said predetermined path, and means controlled by said sensing means for positively increasing and decreasing the supply of pressurized fluid to said cylinders in varying rates irrespective of the direction of rate variation and as determined by said sensing means and as required to maintain movement of the load supported by said cylinders along a predetermined path.

3. A multi-legged extensible load-carrying jack assembly including in each leg thereof a hydraulic cylinder for varying the length of the leg, means for supplying pressurized hydraulic fluid to said leg cylinders and including as part thereof motion sensing means operable to sense non-synchronized movement of said legs relative to one another, and positively synchronized means responsive to said non-synchronized movements as sensed by said sensing means and functioning independently of spring means to vary the flow of hydraulic fluid to said cylinders positively in both directions in a manner compensating for said non-synchronized movements of said legs.

4. A multi-legged jack assembly as defined in claim 3 characterized in that said sensing means is connected in the pressurized fluid flow line for operating the hydraulic cylinders in each of said extensible legs.

5. A multi-legged jack assembly as defined in claim 3 characterized in the provision of means for extending said jack legs at slightly different synchronized rates whereby said jack is extensible along an axis inclined to an axis normal to a plane through the base ends of said legs.

6. A multi-legged jack assembly including an extensible hydraulic cylinder in each leg thereof, load supporting means interconnecting one set of adjacent ends of said legs, movement sensing means operatively connected to each of said legs and operable to sense minute changes in the angular relationships between said legs and the axis along which a load supported by said jack assembly is being moved, and means responsive to any tendency for variations from a predetermined pattern of the changing angular relations of said legs to one another to vary the rate of pressurized hydraulic fluid flow to said leg cylinders.

7. A jack assembly as defined in claim 6 characterized in that each of said sensing means includes hydraulic slave motor means and a plurality of fluid flow control valve means operable in response to movement of said slave motor means to control the flow rate of pressurized hydraulic fluid relative to an associated one of said cylinders in said jack legs.

8. An automatic flow control device for use in controlling the flow of hydraulic fluid to a main hydraulic cylinder, said device including slave motor means having relatively movable parts, one of said parts being connected to a movable portion of said main cylinder and another of said parts being held stationary along with a stationary portion of the main cylinder, said slave motor means including automatic valve means movably connected directly therewith and adapted to be connected in fluid circuit with pressurized hydraulic fluid flowing to said main cylinder to operate the same, said automatic valve means being movable in opposite directions by said pressurized hydraulic fluid in response to unintended movement of the main cylinder to vary the hydraulic fluid flow to said main cylinder.

9. Flow control means for a load-supporting hydraulic cylinder comprising a slave cylinder having a piston movable axially thereof, said cylinder having provision for connecting the same to a movable part of a load-supporting cylinder, said piston having rod means adapted to have an outer end portion thereof connected to a stationary part of said load-supporting cylinder, said piston rod means having a cylindrical cavity therein housing a close-fitting piston having limited to-and-fro movement between the opposite ends of said cylindrical cavity, means for conveying pressurized hydraulic fluid through said close-fitting piston and to the fluid chamber of said load-supporting cylinder, and a pair of flow control valves movable relative to said close-fitting piston and arranged to increase and to decrease the fluid flow rate in accordance with the direction of relative movement between said slave cylinder and the piston therewithin, whereby said slave cylinder and said pair of valves and associated components function as a combined flow-control and movement-sensing mechanism for said load-supporting cylinder.

10. Flow control means as defined in claim 9 characterized in the provision of conduit means interconnecting the opposite ends of said slave cylinder, said conduits and said slave cylinder being charged with fluid adapted to be transferred between the opposite ends of said slave cylinder and effective to permit movement of said close fitting piston within said cylindrical cavity so long as the fluid filling said slave cylinder is free to move between the opposite ends of the slave cylinder, and means for controlling the movement of fluid between the opposite ends of said slave cylinder.

11. A plurality of flow control means as defined in claim 10 characterized in that each one thereof is adapted to be connected similarly to a different load-supporting cylinder, and further characterized in that said conduit means for said slave cylinder are so arranged that all of said slave cylinders are connected in a closed fluid-filled circuit with the far end of each slave cylinder being connected to the near end of another slave cylinder.

12. In a flow control and movement synchronizing assembly for use in coordinating the movement of a plurality of load-supporting hydraulic cylinders, that improvement wherein each of said load-supporting cylinders has operatively connected thereto an extensive slave motor unit having one of its ends operatively connected to a movable section of an associated load-supporting cylinder and the other end to a stationary support, each slave motor unit including a piston head and a connected rod movable axially of a cavity of a second piston head and rod, one of said piston heads including flow control valve means therein operable to vary the fluid flow rate therethrough in response to relative axial movements of said two piston heads, and fluid-filled conduit means connecting the opposite ends of the other of said slave motor piston heads in a common series circuit.

13. Flow control and movement synchronizing mechanism for use with hydraulic jacks, said mechanism comprising a slave motor having a piston and rod unit movable axially thereof, said rod having a cylindrical cavity therein slidably supporting a hollow piston and an associated rod, means for conducting pressurized fluid to and from the interior of said hollow piston, said hollow piston having movably supported therein a pair of flow control valves including operating means therefor bearing against the opposite ends of said cylindrical cavity, the movement of said two pistons relative to one another being effective to open further one of said valves to increase the flow of pressurized fluid in one direction, one of said valves being operable to regulate fluid flow during the extension of said slave motor, and the other valve being operable to regulate fluid flow in the opposite direction during retrograde movement of said slave motor, and fluid-filled conduit means interconnecting the opposite ends of said slave motor effective to accommodate changing distances between the relatively movable sections of said jack as the same extends and contracts.

14. In synchronizing control mechanism for a load-supporting hydraulic cylinder assembly, a slave motor including a piston therein having movably connected thereto a valve housing movably supporting a plurality of valve assemblies, fluid flow passage means having a pair of parallel passages therein, a pair of valve assemblies in each of said parallel passages, each of said valve assemblies including a one-way check valve and a flow-regulating valve in series with each of said one-way valves and opening in reverse directions to one another, means holding said flow-regulating valves stationary as said valve housing moves to-and-fro through a limited path axially of said flow-regulating valves, one of said valve assemblies being effective to regulate fluid flow in one direction and the other being effective to regulate flow in the opposite direction.

15. Synchronizing control mechanism as defined in claim 14 characterized in that the effective area of one of said flow-regulating valves is larger than the other whereby the pressure of the fluid being regulated is effective to urge said valve housing in the direction exhibiting greater surface area exposed to the fluid pressure.

16. In the combination which includes a plurality of hydraulic cylinder assemblies connected in parallel to move a load and including a source of pressurized fluid connected with each of said cylinders to operate the same; that improvement which comprises extensible sensing means connected with each of said hydraulic cylinder assemblies and including means for normally maintaining said sensing means under slight tension and operable to sense and measure variations from a predetermined normal in increments of movement of the associated load-moving cylinder assemblies, means responsive to the magnitude of said increment variations to vary the rate at which pressurized fluid is supplied to the said associated cylinder assembly, said varied rate of fluid supply being effective to maintain the movement of the said associated cylinder assembly along a predetermined axis.

17. A multiple-legged hydraulic jack assembly having an extensible main cylinder assembly in each leg thereof, means for supplying pressurized fluid to each of said cylinder assemblies by way of automatic flow control means operatively associated with each one thereof, said automatic flow control means including a fluid-filled slave cylinder having a movable element therein, said slave cylinder and element being normally maintained under tension and having one end connected to an associated leg of said jack assembly and another end anchored to a stationary support, conduit means connecting said slave cylinders in a closed loop circuit including therein the opposite ends of said slave cylinders, and flow regulating means for each of said main cylinders responsive to a disproportionately large extension movement of the movable element of one of said slave cylinders to throttle fluid flow to the associated one of said main cylinders thereby to maintain all of said cylinders under substantially uniform movement to move a load along a predetermined path.

18. In combination with a hydraulic cylinder, movement sensing and automatic flow control means for controlling the flow of fluid to and from said cylinder, said sensing and flow control means having an axis located at an angle to the axis of said cylinder with one end thereof pivotally connected to a fixed support associated with the fixed end of said cylinder and its other end pivotally associated with the movable end of said cylinder, said sensing means including a pair of components movable relatively of one another, means for maintaining said pair of components under tension while fluid is being supplied to said cylinder, and valve means operatively associated with said tensioning means and responsive to any tendency to change the angular relationship between the axes of said cylinder and of said sensing and flow control means to vary the flow of pressurized fluid to said cylinder.

19. The combination defined in claim 18 characterized in the provision of means for energizing said tensioning means utilizing the pressurized fluid controlled by said valve means.

20. In a hydraulic jack assembly having a plurality of extensible jack cylinders cooperable to move a load, automatic sensing means for sensing any tendency for said cylinders to move except at predetermined rates, said sensing means having one end operatively connected to at least one of said cylinders, and valve means responsive to impulses sensed by any one of said sensing means and indicative of any tendency thereof to move at other than its said predetermined rate to vary the flow of pressurized fluid connected therewith to compensate for said tendency in rate change.

21. A jack assembly as defined in claim 6 characterized in the provision of means responsive to unequal load conditions in the resepective cylinders, to changing pressure conditions in said cylinders and to loads acting laterally of the axes of said cylinders to block any and all transfer of fluid between said cylinders to avoid any possibility of the shifting of said cylinders relative to one another.

22. The combination defined in claim 16 characterized in the provision of means responsive to a change in the pressure of said pressurized fluid indicative of unequal load conditions on any one of said hydraulic cylinders to prohibit any transfer of fluid between said cylinders in response to said unequal load conditions.

23. The combination defined in claim 22 further characterized in that said means for prohibiting the transfer of fluid between said cylinders is operable independently of said means for varying the rate at which pressurized fluid is supplied to said cylinder assemblies.

References Cited in the file of this patent
UNITED STATES PATENTS

| | | |
|---|---|---|
| 2,759,330 | Van Broekhoven et al. | Aug. 21, 1956 |
| 2,782,603 | Beecroft | Feb. 26, 1957 |